United States Patent
Shishido et al.

(10) Patent No.: US 12,485,620 B2
(45) Date of Patent: Dec. 2, 2025

(54) THREE-DIMENSIONAL SHAPING APPARATUS

(71) Applicant: SEIKO EPSON CORPORATION, Tokyo (JP)

(72) Inventors: Naoki Shishido, Shonai-Machi (JP); Akira Kitahara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/808,475

(22) Filed: Jun. 23, 2022

(65) Prior Publication Data

US 2022/0410490 A1    Dec. 29, 2022

(30) Foreign Application Priority Data

Jun. 24, 2021  (JP) ................ 2021-104750

(51) Int. Cl.
| | |
|---|---|
| B29C 64/393 | (2017.01) |
| B29C 64/209 | (2017.01) |
| B29C 64/295 | (2017.01) |
| B33Y 30/00 | (2015.01) |
| B33Y 50/02 | (2015.01) |

(52) U.S. Cl.
CPC .......... *B29C 64/393* (2017.08); *B29C 64/209* (2017.08); *B29C 64/295* (2017.08); *B33Y 30/00* (2014.12); *B33Y 50/02* (2014.12)

(58) Field of Classification Search
CPC .... B29C 64/393; B29C 64/295; B29C 64/209
See application file for complete search history.

(56) References Cited

U.S. PATENT DOCUMENTS

| | | | |
|---|---|---|---|
| 10,898,971 B2 | 1/2021 | Yoshimura | |
| 11,026,433 B2 * | 6/2021 | Contractor | A23L 33/10 |

(Continued)

FOREIGN PATENT DOCUMENTS

| | | |
|---|---|---|
| JP | 2012-213972 | 11/2012 |
| JP | 2015-196164 | 11/2015 |

(Continued)

OTHER PUBLICATIONS

Markforged Industrial Printer User Guide (Year: 2019).*

(Continued)

*Primary Examiner* — Alison L Hindenlang
*Assistant Examiner* — Erica Hartsell Funk
(74) *Attorney, Agent, or Firm* — WORKMAN NYDEGGER

(57) ABSTRACT

A three-dimensional shaping apparatus includes: a discharge unit having a nozzle opening and configured to discharge a shaping material from the nozzle opening; a stage having a shaping surface supporting the shaping material discharged from the discharge unit; a sensor unit configured to detect the shaping material supported on the shaping surface; and a control unit configured to control the discharge unit to laminate the shaping material on the shaping surface, thereby shaping a three-dimensional shaped object. The control unit is configured to execute, before start of the shaping of the three-dimensional shaped object, a remaining detection step of detecting the shaping material remaining on the shaping surface by controlling the sensor unit.

13 Claims, 10 Drawing Sheets

(56) References Cited

U.S. PATENT DOCUMENTS

| | | | | |
|---|---|---|---|---|
| 2002/0113331 | A1* | 8/2002 | Zhang | B29C 64/118 |
| | | | | 264/308 |
| 2015/0057784 | A1* | 2/2015 | Butler | G06F 3/1288 |
| | | | | 700/119 |
| 2015/0100149 | A1* | 4/2015 | Coeck | G01S 5/16 |
| | | | | 700/120 |
| 2016/0288415 | A1* | 10/2016 | Fromm | B29C 64/295 |
| 2017/0136578 | A1 | 5/2017 | Yoshimura | |
| 2018/0311894 | A1 | 11/2018 | Saito et al. | |
| 2020/0086560 | A1* | 3/2020 | Blair | B29C 48/355 |
| 2020/0307082 | A1* | 10/2020 | Yuwaki | B33Y 10/00 |
| 2021/0031458 | A1* | 2/2021 | Ong | B29C 64/393 |

FOREIGN PATENT DOCUMENTS

| | | |
|---|---|---|
| JP | 2018-187777 | 11/2018 |
| JP | 2020-151933 | 9/2020 |
| JP | 2021-045902 | 3/2021 |

OTHER PUBLICATIONS

Video of Markforged X7 laser bed leveling from Humston Machinery Inc., https://youtu.be/UcnpBeezell, accessed Jun. 14, 2023, uploaded Apr. 19, 2018 (Year: 2018).*

Bausch (3D printing onto Unknown Uneven Surfaces), IFAC-PapersOnLine, vol. 49, Issue 21,pp. 583-590 (Year: 2016).*

* cited by examiner

THREE-DIMENSIONAL SHAPING APPARATUS

The present application is based on, and claims priority from JP Application Serial Number 2021-104750, filed Jun. 24, 2021, the disclosure of which is hereby incorporated by reference herein in its entirety.

BACKGROUND

1. Technical Field

The present disclosure relates to a three-dimensional shaping apparatus.

2. Related Art

Regarding a three-dimensional shaping apparatus, JP-A-2020-151933 discloses a technique of detecting a temperature of a shaping layer during shaping and shaping a shaped object while monitoring a shaping situation.

In the three-dimensional shaping apparatus as described above, after shaping a previous shaped object is completed, shaping of a next shaped object may be started in a state where the previous shaped object remains on a stage, and the previous shaped object or the apparatus may be damaged due to contact between the previous shaped object and the device.

SUMMARY

According to an aspect of the present disclosure, a three-dimensional shaping apparatus is provided. The three-dimensional shaping apparatus includes: a discharge unit having a nozzle opening and configured to discharge a shaping material from the nozzle opening; a stage having a shaping surface supporting the shaping material discharged from the discharge unit; a sensor unit configured to detect the shaping material supported on the shaping surface; and a control unit configured to control the discharge unit to laminate the shaping material on the shaping surface, thereby shaping a three-dimensional shaped object. The control unit is configured to execute, before start of the shaping of the three-dimensional shaped object, a remaining detection step of detecting the shaping material remaining on the shaping surface by controlling the sensor unit.

DESCRIPTION OF EXEMPLARY EMBODIMENTS

A. First Embodiment

Figure 1:
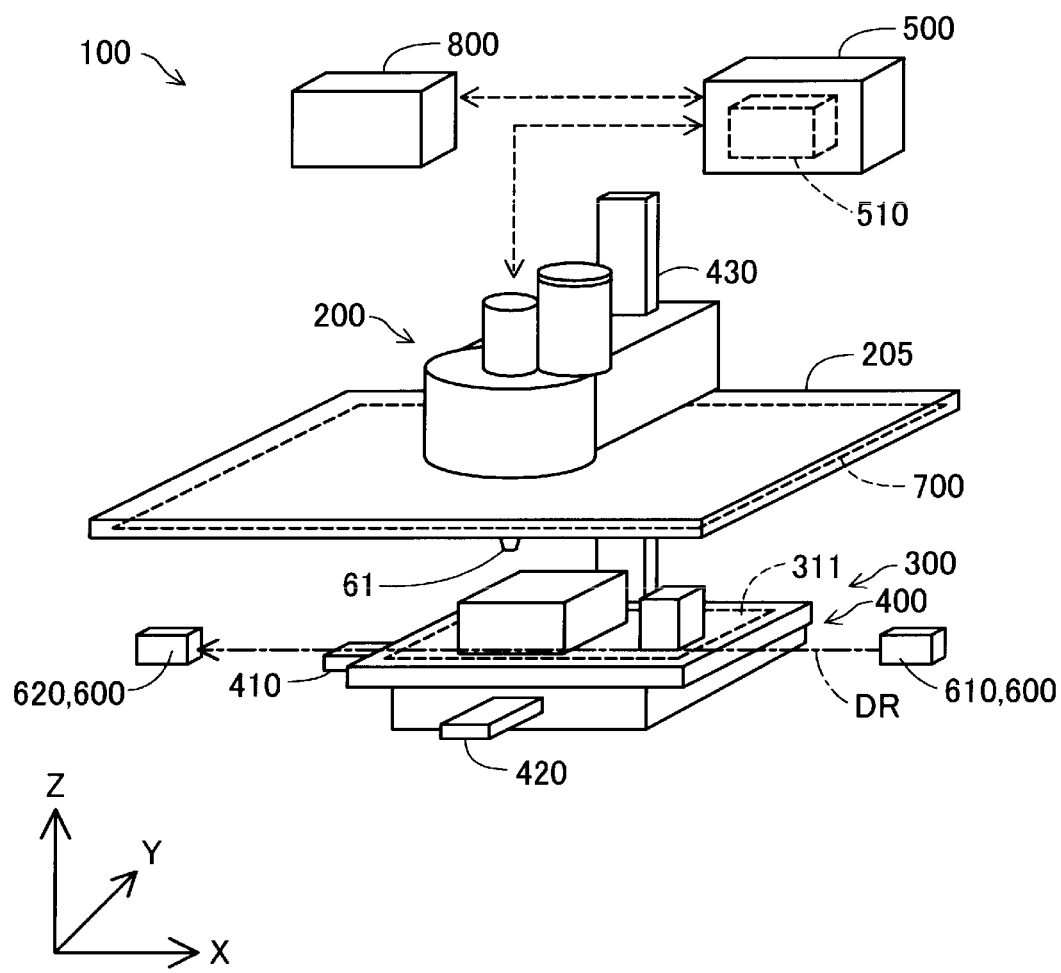
FIG. 1 is a first diagram illustrating a schematic configuration of a three-dimensional shaping apparatus according to a first embodiment.
Figure 2:
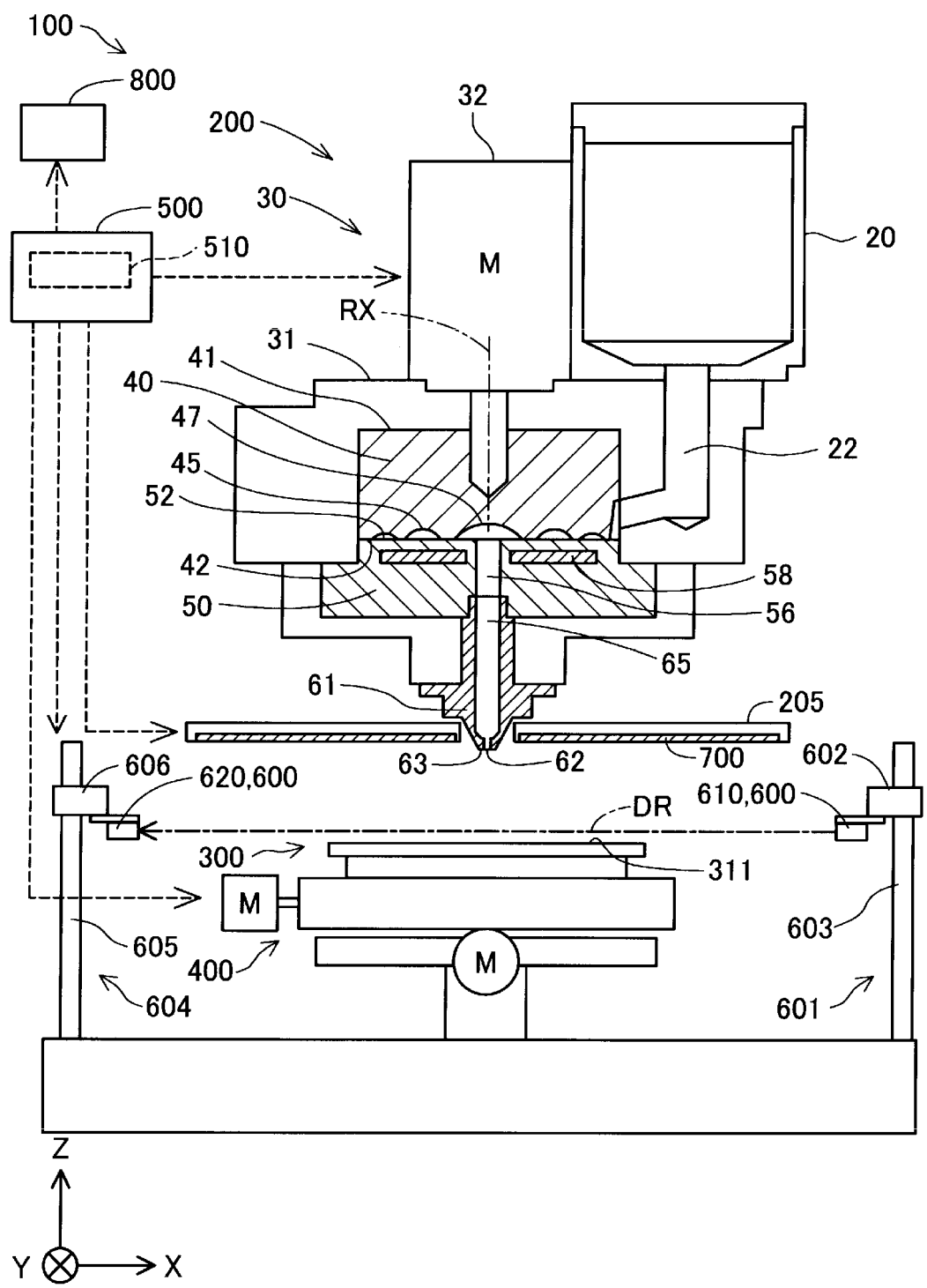
FIG. 2 is a second diagram illustrating the schematic configuration of the three-dimensional shaping apparatus according to the first embodiment.

FIG. 1 is a first diagram illustrating a schematic configuration of a three-dimensional shaping apparatus 100 according to a first embodiment. FIG. 2 is a second diagram illustrating the schematic configuration of the three-dimensional shaping apparatus 100 according to the first embodiment. FIGS. 1 and 2 show arrows along X, Y, and Z directions orthogonal to one other. The X, Y, and Z directions are directions along an X axis, a Y axis, and a Z axis, which are three spatial axes that are orthogonal to one another, and include both a direction on one side and an opposite direction thereto along the X axis, the Y axis, and the Z axis. The X axis and the Y axis are axes along a horizontal plane, and the Z axis is an axis along a vertical line. A −Z direction is a vertical direction, and a +Z direction is a direction opposite to the vertical direction. The −Z direction is also referred to as "lower", and the +Z direction is also referred to as "upper". In other figures, the arrows along the X, Y, and Z directions are shown as appropriate. The X, Y, and Z directions in FIGS. 1 and 2 and the X, Y, and Z directions in other figures represent the same directions. In the present description, the term "orthogonal" includes a range of 90°±10°.

As shown in FIGS. 1 and 2, the three-dimensional shaping apparatus 100 includes a discharge unit 200, a stage 300, a position change unit 400, a control unit 500, a sensor unit 600, a heating unit 700, and a notification unit 800.

Under control of the control unit 500, the discharge unit 200 discharges a shaping material, obtained by melting a solid material into a paste shape, onto the stage 300 for shaping, which serves as a base of a three-dimensional shaped object. As illustrated in FIG. 2, the discharge unit 200 includes a material supply unit 20 which is a supply source of the material before being converted into the molding material, a plasticizing unit 30 that plasticizes the material to generate the shaping material, and a nozzle 61 that discharges the generated shaping material. The discharge unit 200 may be referred to as a head.

The material supply unit 20 accommodates the material in a state of pellets, powder, or the like. In the present embodiment, an ABS resin formed into a pellet shape is used as the material. The material supply unit 20 according to the present embodiment is configured with a hopper. A supply path 22 that couples the material supply unit 20 and the plasticizing unit 30 is provided below the material supply unit 20. The material supply unit 20 supplies the material to the plasticizing unit 30 via the supply path 22.

The plasticizing unit 30 includes a screw case 31, a drive motor 32, a screw 40, and a barrel 50. The plasticizing unit 30 plasticizes at least a part of the material supplied from the material supply unit 20 to generate a paste-like shaping material having fluidity, and supplies the shaping material to the nozzle 61. The term "plasticize" means applying heat to a thermoplastic material to melt the thermoplastic material. The term "melt" means not only heating the thermoplastic material to a temperature equal to or higher than a melting point into a liquid, but also heating the thermoplastic material to a temperature equal to or higher than a glass transition point, thereby softening the material and exhibiting fluidity. The screw 40 according to the present embodiment is a so-called flat screw, and may be referred to as "scroll".

The screw case 31 is a housing for accommodating the screw 40. The barrel 50 is fixed to a lower surface of the screw case 31, and the screw 40 is accommodated in a space surrounded by the screw case 31 and the barrel 50. On a surface facing the barrel 50, the screw 40 has a groove-formed surface 42 formed with grooves 45. The drive motor 32 is fixed to an upper surface of the screw case 31. A rotation shaft of the drive motor 32 is coupled to an upper surface 41 side of the screw 40. The drive motor 32 may not be directly coupled to the screw 40, and for example, the screw 40 and the drive motor 32 may be coupled to each other via a speed reducer. The drive motor 32 is driven under the control of the control unit 500.

The barrel 50 is arranged below the screw 40. The barrel 50 has a screw-facing surface 52 facing the groove-formed surface 42 of the screw 40. The barrel 50 is provided with a communication hole 56 on a central axis RX of the screw 40. The communication hole 56 communicates with a nozzle flow path 65 of the nozzle 61 to be described later. A heater 58 is built in the barrel 50 at a position facing the grooves 45 of the screw 40. A temperature of the heater 58 is controlled by the control unit 500.

Figure 3:
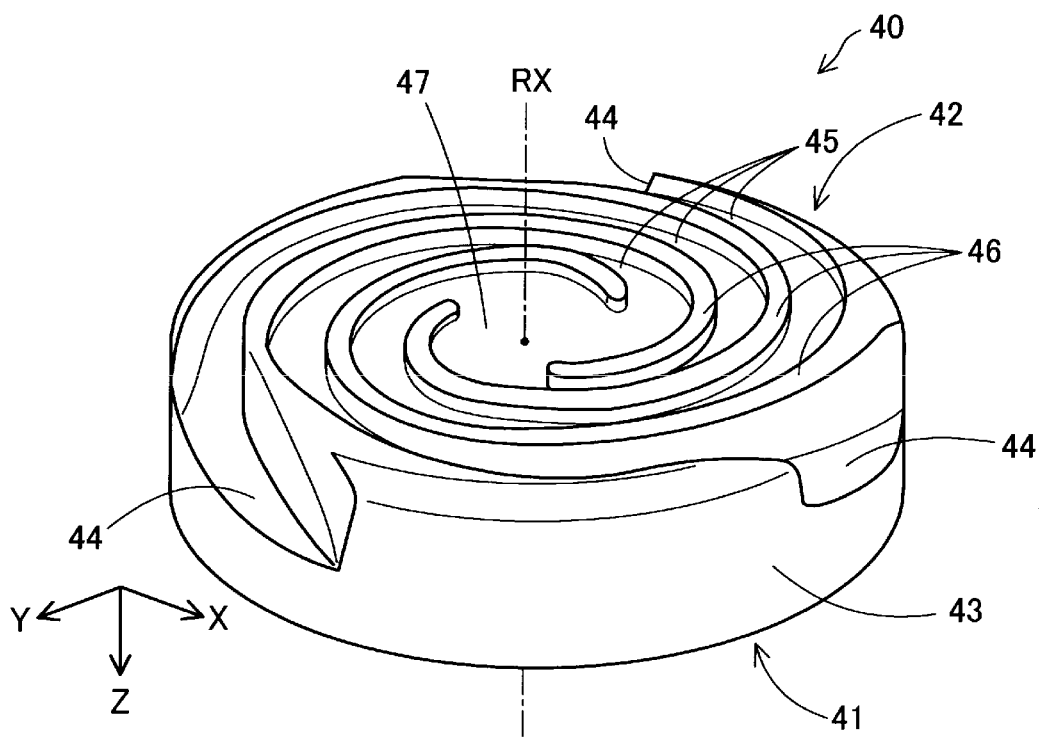
FIG. 3 is a schematic perspective view illustrating a configuration of a groove-formed surface side of a screw.

FIG. 3 is a schematic perspective view illustrating a configuration of the groove-formed surface side of the screw 40. A central portion 47 of the groove-formed surface 42 of the screw 40 is a recess coupled to one end of each of the grooves 45. The central portion faces the communication hole 56 of the barrel 50 illustrated in FIG. 2. The central portion 47 intersects the central axis RX.

The grooves 45 constitute a so-called scroll groove. The grooves 45 extend in a spiral shape in a manner of drawing an arc from the central portion 47 toward an outer periphery of the screw 40. The groove-formed surface 42 is provided with ridge portions 46 that constitute side wall portions of the grooves 45 and extend along the grooves 45. Each groove 45 is continuous to a material introduction port 44 formed in a side surface 43 of the screw 40. The material introduction port 44 is a portion for receiving the material supplied via the supply path 22 of the material supply unit 20. As illustrated in FIG. 2, in the present embodiment, three grooves 45 are separated from one another by the ridge portions 46. The number of the grooves 45 is not limited to three, and may be one or two or more. A shape of the grooves 45 is not limited to a spiral shape, and may be a helical shape or an involute curve shape, or may be a shape extending in a manner of drawing an arc from the central portion 47 toward an outer periphery.

Figure 4:
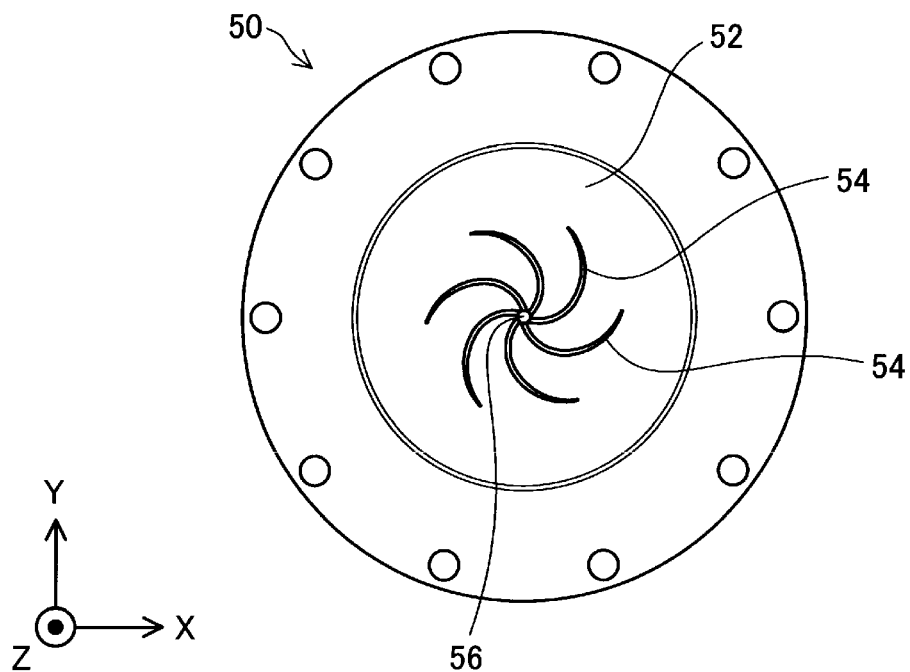
FIG. 4 is a top view illustrating a configuration of a screw-facing surface side of a barrel.

FIG. 4 is a top view illustrating a configuration of the screw-facing surface 52 side of the barrel 50. As described above, the communication hole 56 is formed in a center of the screw-facing surface 52. A plurality of guide grooves 54 are formed around the communication hole 56 in the screw-facing surface 52. Each guide groove 54 has one end coupled to the communication hole 56 and extends in a spiral shape from the communication hole 56 toward an outer periphery of the screw-facing surface 52. Each guide groove 54 has a function of guiding the shaping material to the communication hole 56. One end of each guide groove 54 may not be coupled to the communication hole 56. The guide grooves 54 may not be formed in the barrel 50.

As illustrated in FIG. 2, the nozzle 61 has the nozzle flow path 65 and a tip surface 63 provided with the nozzle opening 62. The nozzle flow path 65 is a flow path of the shaping material formed in the nozzle 61, and is coupled to the communication hole 56 of the barrel 50 described above. The tip surface 63 is a surface constituting a tip portion of the nozzle 61 and protruding in the −Z direction toward a shaping surface 311. The nozzle opening 62 is a portion that is provided at an end portion of the nozzle flow path 65 on a side communicating with the atmosphere and that has a reduced flow path cross section of the nozzle flow path 65. The shaping material generated by the plasticizing unit 30 is supplied to the nozzle 61 via the communication hole 56 and is discharged from the nozzle opening 62 via the nozzle flow path 65.

The stage 300 is arranged at a position facing the tip surface 63 of the nozzle 61. The stage 300 has the shaping surface 311 on at least a part of an upper surface of the stage 300. The shaping material discharged from the nozzle opening 62 of the nozzle 61 is laminated on the shaping surface 311. The shaping surface 311 of the present embodiment is a rectangular surface parallel to the X and Y directions. The three-dimensional shaping apparatus 100 shapes the three-dimensional shaped object by discharging the shaping material from the nozzle 61 toward the shaping surface 311 of the stage 300 and laminating layers of the shaping material. Hereinafter, a direction in which the shaping material is laminated on the shaping surface 311 may be referred to as a lamination direction. A direction along the shaping surface 311 may be referred to as a first direction, and a direction along the shaping surface 311 and intersecting the first direction may be referred to as a second direction. In addition, a direction perpendicular to the shaping surface 311 may be referred to as a third direction. The lamination direction, the first direction, the second direction, and the third direction include both a direction on one side and an opposite direction thereto along the same axis. In the present embodiment, the lamination direction and the third direction are the Z direction, the first direction is the X direction, and the second direction is the Y direction.

The position change unit 400 changes a relative position between the discharge unit 200 and the stage 300. In the present embodiment, the position change unit 400 changes the relative position between the discharge unit 200 and the stage 300 in the X and Y directions by moving the stage 300 in the X and Y directions, and changes the relative position between the discharge unit 200 and the stage 300 in the Z direction by moving the discharge unit 200 along the Z direction. As illustrated in FIG. 1, in the present embodiment, the position change unit 400 includes a first electric actuator 410 for moving the stage 300 along the X direction, a second electric actuator 420 for moving the stage 300 and the first electric actuator 410 along the Y direction, and a third electric actuator 430 for moving the discharge unit 200 along the Z direction. Each electric actuator 410 to 430 is driven under the control of the control unit 500. In another embodiment, for example, the position change unit 400 may move the stage 300 along the Z direction and move the discharge unit 200 along the X and Y directions, or may move the stage 300 along the X, Y, and Z directions without moving the discharge unit 200, or may move the discharge unit 200 along the X, Y, and Z directions without moving the stage 300.

Hereinafter, a change in the relative position of the discharge unit 200 relative to the stage 300 may be simply referred to as movement of the discharge unit 200. In the present embodiment, for example, movement of the stage 300 in a +X direction with respect to the discharge unit 200 can also be rephrased as the movement of the discharge unit 200 in a −X direction. Similarly, a change in a relative position of the nozzle 61, or the sensor unit 600 and the heating unit 700 to be described later, relative to the stage 300 may be simply referred to as movement of the nozzle 61, the sensor unit 600, or the heating unit 700.

The sensor unit 600 illustrated in FIGS. 1 and 2 detects the shaping material supported on the shaping surface 311. In the present embodiment, the sensor unit 600 is configured with an optical sensor for optically detecting the shaping material supported on the shaping surface 311. The sensor unit 600 includes a beam emitting unit 610 for emitting a detection beam DR and a beam receiving unit 620 for receiving the detection beam DR emitted from the beam emitting unit 610. The beam emitting unit 610 and the beam receiving unit 620 are electrically coupled to the control unit 500 via a wiring (not shown).

In the present embodiment, the beam emitting unit 610 is configured with a laser oscillator emitting a laser beam as the detection beam DR. As illustrated in FIG. 2, the beam emitting unit 610 is supported by a first support unit 601. The first support unit 601 includes a first holder 602 supporting the beam emitting unit 610 and a first support pole 603 fixed with the first holder 602. The first support pole 603 is arranged at a position in the +X direction of the stage 300 such that a longitudinal direction of the first support pole 603 is along the Z direction. The first holder 602 is fixed to the first support pole 603 such that a position with respect to the first support pole 603 in the Z direction and an angle with respect to the first support pole 603 can be adjusted. In the present embodiment, the beam emitting unit 610 is supported by the first support unit 601 such that the detection beam DR emitted from the beam emitting unit 610 travels above the shaping surface 311 along the first direction, more specifically, in the −X direction. The expression "above the shaping surface 311" refers to an upper surface of the shaping surface 311 and a region above the upper surface of the shaping surface 311.

In the present embodiment, the beam receiving unit 620 is configured with a laser diode and receives the detection beam DR to convert the detection beam DR into an electric signal. The beam receiving unit 620 is supported by a second support unit 604 so as to face the beam emitting unit 610 in the first direction, that is, the X direction. The second support unit 604 includes a second holder 606 supporting the beam receiving unit 620 and a second support pole 605 fixed with the second holder 606. The second support unit 604 is configured in the same manner as the first support unit 601 except that the second support unit 604 supports the beam receiving unit 620 instead of the beam emitting unit 610. The second support pole 605 is arranged at a position in the −X direction relative to the stage 300 such that a longitudinal direction of the second support pole 605 is along the Z direction and a position of the second support pole 605 in the Y direction coincides with a position of the first support pole 603 in the Y direction. Therefore, in the present embodiment, the beam receiving unit 620 faces the beam emitting unit 610 in the X direction with the shaping surface 311 interposed therebetween.

In the present embodiment, the position change unit 400 described above functions as a first movement unit moving the sensor unit 600 relative to the stage 300 along the Y direction. More specifically, the second electric actuator 420 of the position change unit 400 moves the stage 300 along the Y direction with respect to the fixed beam emitting unit 610 and beam receiving unit 620, so that the sensor unit 600 moves relative to the stage 300 along the Y direction.

The heating unit 700 illustrated in FIGS. 1 and 2 is a member for heating the shaping material laminated on the shaping surface 311. The heating unit 700 of the present embodiment is arranged on an outer periphery of the nozzle 61 and fixed to the discharge unit 200 via a support unit 205. The support unit 205 has a rectangular plate-like outer shape, and is provided with a through hole on a center of the support unit 205. The nozzle 61 is inserted through the through hole. The heating unit 700 is arranged parallel to the shaping surface 311. The heating unit 700 moves in accordance with the discharge unit 200, which is moved by the position change unit 400.

The heating unit 700 of the present embodiment is configured with a heater and may uniformly heat the entire shaping surface 311. More specifically, an area of the heating unit 700 is larger than an area of the shaping surface 311, and an outer peripheral edge of the heating unit 700 is arranged outside a region in which the stage 300 moves with respect to the discharge unit 200 when viewed along the Z direction. That is, regardless how the relative position between the heating unit 700 and the stage 300 is changed by the position change unit 400, the stage 300 is arranged inside the outer peripheral edge of the heating unit 700 when viewed along the Z direction. The heater configuring the heating unit 700 may be, for example, a halogen heater, a nichrome wire heater, or a carbon heater, or may be a heater blowing hot air.

In the present embodiment, the heating unit 700 and the sensor unit 600 are arranged at positions not overlapping each other when viewed along the Z direction. More specifically, the beam emitting unit 610 is arranged at a position in the +X direction with respect to an end portion of the heating unit 700 in the +X direction. The beam receiving unit 620 is arranged at a position in the −X direction with respect to an end portion of the heating unit 700 in the −X direction.

The notification unit 800 notifies a user of information. The notification unit 800 of the present embodiment is configured with a liquid crystal monitor coupled to the control unit 500 and notifies information by displaying visual information on the liquid crystal monitor. The notification unit 800 notifies, for example, a control state of the three-dimensional shaping apparatus 100 as the information. For example, when the discharge unit 200 or the stage 300 is installed in a housing, the notification unit 800 may be arranged on an outer wall surface of the housing as a monitor visible from an outside of the housing.

The control unit 500 is a control device controlling an overall operation of the three-dimensional shaping apparatus 100. The control unit 500 is configured with a computer including one or a plurality of processors, a memory, and an input and output interface for receiving and outputting signals from and to an outside. The control unit 500 has a function of executing, for example, a three-dimensional shaping process for shaping the three-dimensional shaped object by the processor executing a program or a command read into a main storage device. Instead of being configured with a computer, the control unit 500 may be implemented by a configuration of combining a plurality of circuits each implementing at least some of the functions.

The control unit 500 includes a detection unit 510. The detection unit 510 of the present embodiment is a function unit implemented by the control unit 500 executing a program. The control unit 500 functioning as the detection unit 510 executes the remaining detection step before start of the shaping of the three-dimensional shaped object. The remaining detection step refers to a step of detecting a remaining shaping material, which is the shaping material remaining on the shaping surface 311, by controlling the sensor unit 600 described above. The remaining shaping material detected in the remaining detection step is a shaping material that has already been supported on the shaping surface 311 before the start of the shaping of the three-dimensional shaped object, and is, for example, a three-dimensional shaped object previously shaped on the shaping surface 311 and a fragment thereof, or a residue of a shaping material dropped onto the shaping surface 311 from the discharge unit 200 or the like when a previous three-dimensional shaped object is shaped. Details of the remaining detection step will be described later. In another embodiment, the detection unit 510 may be configured with, for example, a computer or the like separate from the control unit 500.

The three-dimensional shaping process refers to a process for shaping the three-dimensional shaped object. The three-dimensional shaping process is executed by the control unit 500 when a predetermined start operation is performed by the user on an operation panel provided in the three-dimensional shaping apparatus 100 or a computer coupled to the three-dimensional shaping apparatus 100. The three-dimensional shaping process may be simply referred to as a shaping process. For example, the control unit 500 starts the three-dimensional shaping process when receiving a start command by the user via an input unit or the like (not shown).

Figure 5:
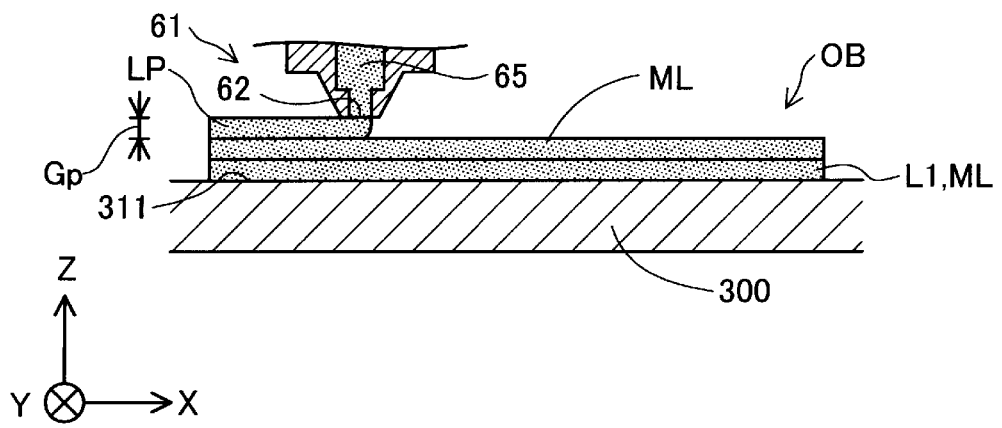
FIG. 5 is a diagram schematically illustrating that a three-dimensional shaped object is shaped.

FIG. 5 is a diagram schematically illustrating that a three-dimensional shaped object OB is shaped by the three-dimensional shaping process. In the shaping process, the control unit 500 appropriately controls the discharge unit 200 and the position change unit 400 illustrated in FIG. 1 in accordance with shaping data to be described later, discharges the shaping material from the nozzle opening 62 of the nozzle 61 toward the stage 300, and laminates layers of the shaping material in the Z direction while solidifying the shaping material on the shaping surface 311, thereby shaping the three-dimensional shaped object OB. The solidification of the material means that the discharged and plasticized material loses fluidity. In the present embodiment, the shaping material is thermally contracted by cooling, loses plasticity, and is solidified.

More specifically, in the shaping process, as illustrated in FIG. 5, the control unit 500 discharges the shaping material from the nozzle 61 while moving the nozzle in the X and Y directions. The shaping material discharged from the nozzle 61 is continuously deposited in a movement direction of the nozzle 61. This shapes a linear portion LP which is a portion extending linearly along a movement pathway of the nozzle 61. The control unit 500 repeats scanning by the nozzle 61 to form a layer ML. After one layer ML is formed, the control unit 500 moves a position of the nozzle 61 with respect to the stage 300 in the Z direction, and further laminates layers ML on the layers ML formed so far to shape the shaped object. Therefore, in the shaping process, the discharge unit 200 and the nozzle 61 are located closest to the shaping surface 311 when a first layer L1 of the three-dimensional shaped object OB is shaped, and then move away from the shaping surface 311 as an upper layer is shaped.

In the shaping process, the control unit 500 discharges the shaping material from the nozzle 61 while maintaining a distance between the nozzle 61 and a discharge target. The discharge target is the shaping surface 311 when the shaping material is to be discharged on the shaping surface 311, and is an upper surface of the shaping material that has already been discharged when the shaping material is to be discharged onto the shaping material that has already been discharged. The distance between the nozzle 61 and the discharge target may be referred to as a gap Gp.

A width of the linear portion LP described above may be referred to as a line width, and a height of the linear portion LP may be referred to as a lamination pitch. In the example of FIG. 5, the line width corresponds to a dimension of the linear portion LP in the Y direction, and the lamination pitch corresponds to a dimension of the linear portion LP in the Z direction. The line width and the lamination pitch are set by a size of the gap Gp described above and an amount of the shaping material discharged from the nozzle 61 per unit movement amount. For example, when the gap Gp is small, the shaping material discharged from the nozzle 61 is more pressed against the discharge target by the nozzle 61 than when the gap Gp is large, and thus the lamination pitch is small and the line width is large. The amount of the shaping material discharged from the nozzle 61 per unit movement amount is set by, for example, a movement speed of the nozzle 61 and an amount of the shaping material discharged from the nozzle per unit time. The amount of the shaping material discharged from the nozzle 61 per unit time is set by, for example, a diameter of the nozzle opening 62 and a flow rate of the shaping material flowing in the nozzle flow path 65.

Figure 6:
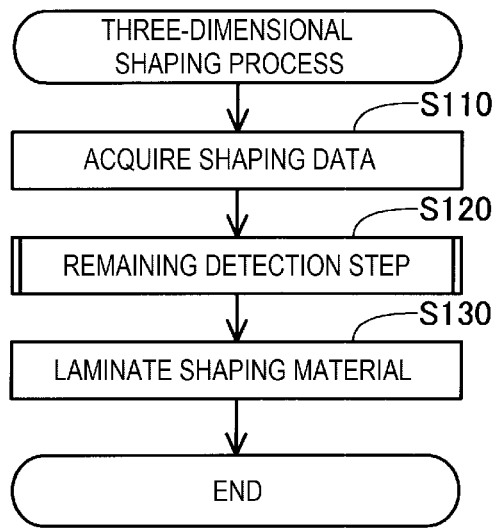
FIG. 6 is a flow chart of a three-dimensional shaping process.

FIG. 6 is a flow chart of the three-dimensional shaping process according to the present embodiment. In step S110, the control unit 500 acquires the shaping data from an external computer, a storage medium, or the like. The shaping data includes shaping path data representing the movement pathway of the nozzle 61 for each layer forming the three-dimensional shaped object. The shaping path data is associated with injection amount data representing an injection amount of the material injected from the nozzle 61.

In step S120, the control unit 500 executes the remaining detection step. In the present embodiment, in the remaining detection step, the control unit 500 detects the remaining shaping material by moving the sensor unit 600 relative to the stage 300 along the second direction, that is, the Y direction, while emitting the detection beam DR from the beam emitting unit 610. More specifically, in the remaining detection step, the control unit 500 detects the remaining shaping material by executing a remaining detection process to be described later to move the sensor unit 600 relative to the stage 300 in a −Y direction from a start position toward an end position.

Figure 7:
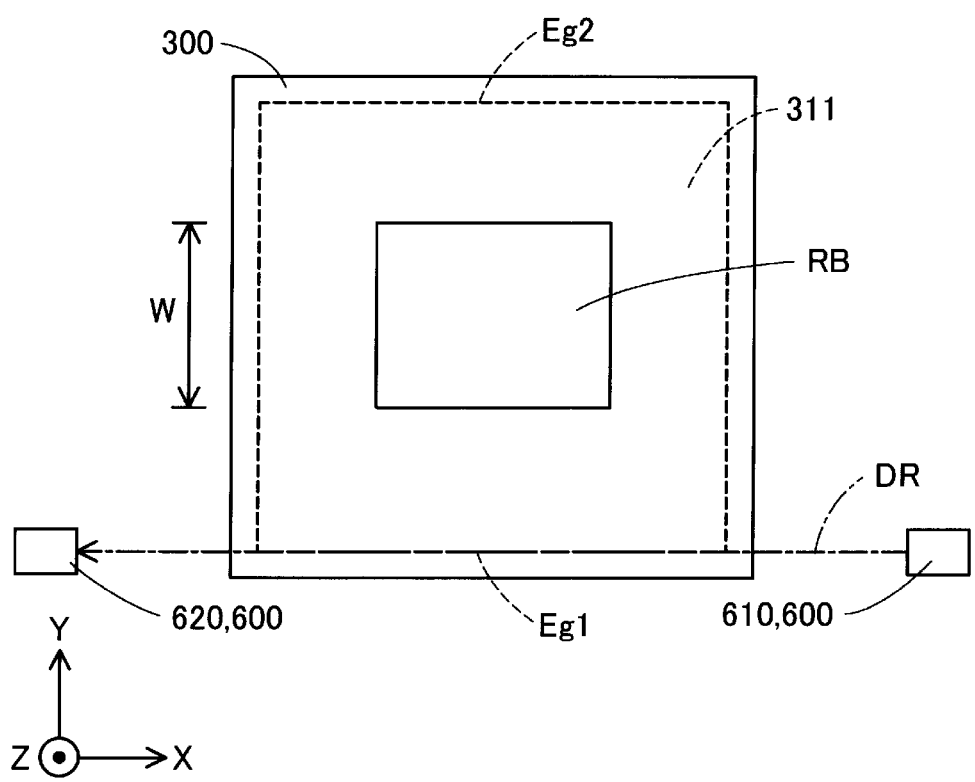
FIG. 7 is a top view illustrating that a sensor unit is located at a start position.
Figure 8:
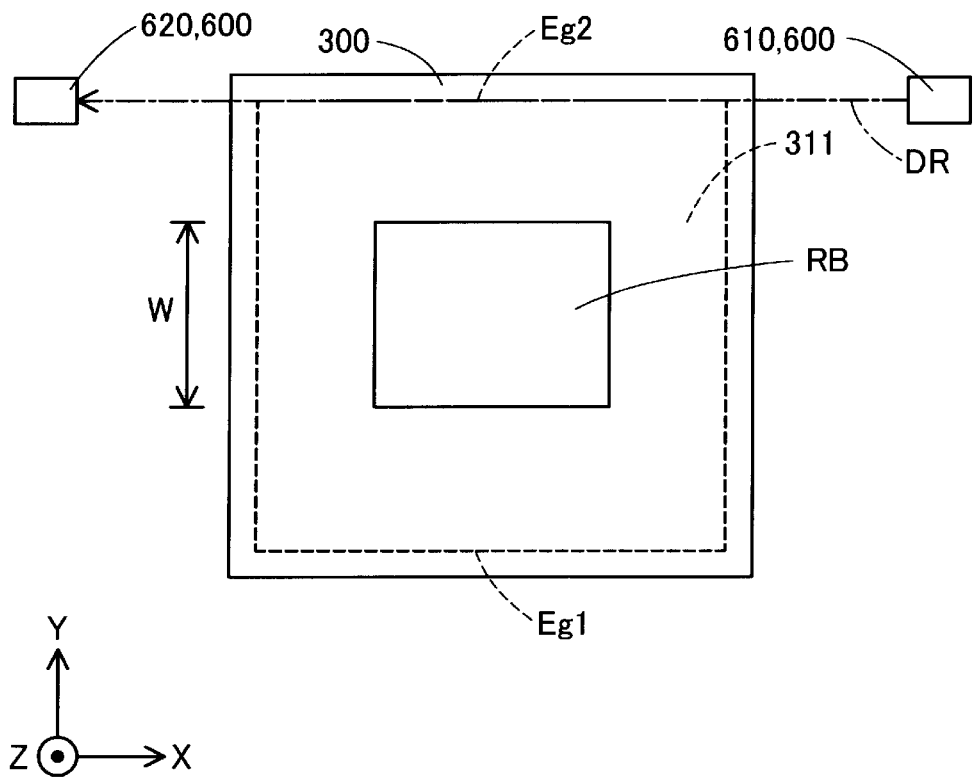
FIG. 8 is a top view illustrating that the sensor unit is located at an end position.

FIG. 7 is a top view illustrating that the sensor unit 600 is located at the start position. FIG. 8 is a top view illustrating that the sensor unit 600 is located at the end position. FIGS. 7 and 8 illustrate the stage 300 and the sensor unit 600 when viewed from above. FIGS. 7 and 8 illustrate a remaining shaped object RB, which is the previously shaped three-dimensional shaped object, as an example of the remaining shaping material supported on the shaping surface 311. As illustrated in FIG. 7, when viewed along the Z direction, the start position of the present embodiment is a position at which the detection beam DR emitted from the beam emitting unit 610 located at the start position overlaps one end portion Eg1 of the shaping surface 311 in the Y direction. As illustrated in FIG. 8, when viewed along the Z direction, the end position of the present embodiment is a position at which the detection beam DR emitted from the beam emitting unit 610 located at the end position overlaps the other end portion Eg2 of the shaping surface 311 in the Y direction. As shown in FIGS. 7 and 8, the one end portion Eg1 is located in a −Y direction of the other end portion Eg2.

Figure 9:
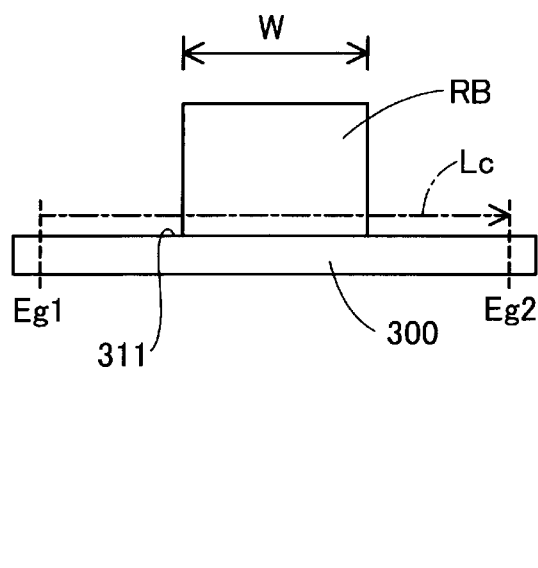
FIG. 9 is a diagram illustrating a trajectory of a detection beam in a Y direction in a remaining detection step.

FIG. 9 is a diagram illustrating a trajectory Lc of the detection beam DR in the Y direction in the remaining detection step. FIG. 9 illustrates that the stage 300 and the above-described remaining shaped object RB are viewed along the X direction. In the remaining detection step, the trajectory Lc is drawn by the position change unit 400 moving the beam emitting unit 610, which emits the detection beam DR traveling in the −X direction, in the +Y direction from the start position toward the end position.

Figure 10:
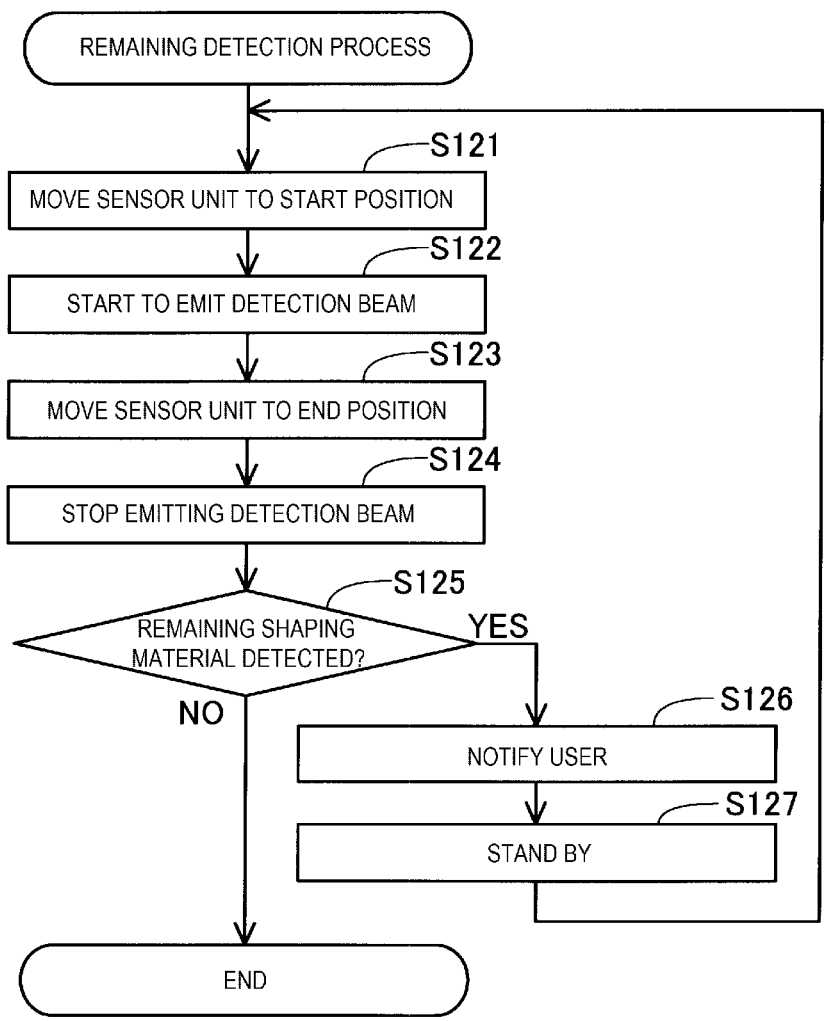
FIG. 10 is a flow chart of a remaining detection process.

FIG. 10 is a flow chart of the remaining detection process executed in step S120 of the above-described FIG. 7. In step S121, the control unit 500 controls the position change unit 400 functioning as the first movement unit to move the sensor unit 600 to the start position as illustrated in FIG. 7. Then, in step S122, the control unit 500 starts to emit the detection beam DR from the beam emitting unit 610. Next, in step S123, the control unit 500 controls the position change unit 400 to move the sensor unit 600 in the +Y direction, thereby moving the sensor unit 600 to the end position in a state where the detection beam DR is emitted from the beam emitting unit 610 as illustrated in FIGS. 8 and 9. Then, in step S124, the control unit 500 stops emitting the detection beam DR.

In step S125, the control unit 500 determines whether the remaining shaping material supported on the shaping surface 311 has been detected. In the remaining detection step, as illustrated in FIG. 9, in a period in which the sensor unit 600 moves from the start position to the end position while drawing the trajectory Lc by the detection beam DR, an intensity of the detection light DR received by the beam receiving unit 620 is reduced in a period in which the remaining shaped object RB is irradiated with the detection beam DR as compared with a period in which the remaining shaped object RB is not irradiated with the detection beam DR. In contrast, for example, when no remaining shaping material such as the remaining shaped object RB is located on the shaping surface 311, in the period in which the sensor unit 600 moves from the start position to the end position, the intensity of the detection beam DR received by the beam receiving unit 620 is substantially constant. Therefore, in step S125 of FIG. 10, the control unit 500 can detect the remaining shaping material based on a detection value of the detection beam DR by the beam receiving unit 620.

More specifically, in the present embodiment, in step S125, when the detection value of the detection beam DR by the beam receiving unit 620 becomes smaller than a preset reference value over a preset determination period, the control unit 500 determines that the remaining shaping material has been detected. The reference value of the detection beam DR may be set based on, for example, a detection value when the detection beam DR is directly received by the beam receiving unit 620 without radiating the remaining shaping material, or set as a small value to such an extent that erroneous detection of the remaining shaping material can be prevented.

The determination period is set based on, for example, a dimension of the shaping material to be detected in the remaining detection step. The period in which the remaining shaped object RB is irradiated with the above-described detection beam DR is set depending on a dimension W of the remaining shaped object RB in the Y direction illustrated in FIGS. 7 to 9 and a movement speed of the sensor unit 600 along the Y direction. Therefore, if the movement speed of the sensor unit 600 is the same, a shaping material having a smaller dimension in the Y direction can be detected as the remaining shaping material when the determination period is smaller. Accordingly, for example, by setting the determination period to a period without detecting a shaping material small enough to not interfere with the operation of the discharge unit 200 or the like when the three-dimensional shaped object OB is shaped, it is possible to not detect but ignore the small shaping material in the remaining detection step.

A lower limit of the dimension in the Z direction of the shaping material that can be detected by the remaining detection step can be changed by changing positions of the beam emitting unit 610 and the beam receiving unit 620 in the Z direction and changing a distance between the detection beam DR and the stage 300. For example, by further reducing the distance between the detection beam DR and the stage 300, a shaping material having a small dimension in the Z direction can be detected as the remaining shaping material. Therefore, for example, by determining positions of the beam emitting unit 610 and the beam receiving unit 620 such that the distance between the detection beam DR and the stage 300 is smaller than the gap Gp, it is possible to detect, as the remaining shaping material, a shaping material that may come into contact with the discharge unit 200 when the three-dimensional shaped object OB is shaped. In addition, as when the determination period is set, the distance between the detection beam DR and the stage 300 may also be determined such that the shaping material small enough to not interfere with the operation of the discharge unit 200 or the like when the three-dimensional shaped object OB is shaped can be ignored.

When the shaping material is detected in step S125 of FIG. 10, in step S126, the control unit 500 notifies the user that the remaining shaping material has been detected by the notification unit 800. Next, in step S127, the control unit 500 causes the three-dimensional shaping apparatus 100 to stand by. For example, the user can remove the remaining shaping material remaining on the shaping surface 311 from the shaping surface 311 while the three-dimensional shaping apparatus 100 is on standby in step S127. In step S127, for example, the control unit 500 may cause the three-dimensional shaping apparatus 100 to stand by for a predetermined period, or may cause the three-dimensional shaping apparatus 100 to stand by until a predetermined restart operation is input by the user. After step S127, the control unit 500 returns the process to step S121.

In step S125, when no remaining shaping material is detected, the control unit 500 ends the remaining detection process. Then, in step S130 of FIG. 6, the control unit 500 controls the discharge unit 200 and the position change unit 400 to start laminating the shaping material on the shaping surface 311, thereby starting shaping the three-dimensional shaped object. That is, in the present embodiment, the remaining detection step is executed before the shaping of the three-dimensional shaped object, and steps S121 to S124 in the remaining detection process of FIG. 10 are repeatedly executed until the remaining shaping material is no longer detected in step S125. Therefore, the shaping of the three-dimensional shaped object is not started until the remaining shaping material is no longer detected on the shaping surface 311.

According to the three-dimensional shaping apparatus 100 of the present embodiment described above, the control unit 500 executes, before the shaping of the three-dimensional shaped object, the remaining detection step of detecting the remaining shaping material by controlling the sensor unit 600 that detects the shaping material supported on the shaping surface 311. Accordingly, when the remaining shaping material is detected by the control unit 500, the remaining shaping material can be removed from the shaping surface 311 before the shaping of the three-dimensional shaped object is started. Therefore, it is possible to prevent damage to the discharge unit 200 and the like of the three-dimensional shaping apparatus 100 due to contact between the discharge unit 200 and the like and the remaining shaping material. In addition, it is possible to prevent damage to the three-dimensional shaped object previously shaped on the shaping surface 311 due to contact between the previously shaped three-dimensional shaped object and the discharge unit 200 or the like.

In the present embodiment, the sensor unit 600 includes the beam emitting unit 610 and the beam receiving unit 620 facing the beam emitting unit 610 in the X direction with the shaping surface 311 interposed therebetween, and the control unit 500 moves the sensor unit 600 relative to the stage 300 along the Y direction while emitting the detection beam DR in the X direction from the beam emitting unit 610 in the remaining detection step. Therefore, it is possible to more easily detect the remaining shaping material without causing the remaining shaping material and the sensor unit 600 to contact each other. In particular, in the present embodiment, when viewed along the Z direction, the start position is the position at which the detection beam DR emitted from the beam emitting unit 610 located at the start position overlaps one end portion Eg1 of the shaping surface 311 in the Y direction. When viewed along the Z direction, the end position is the position at which the detection beam DR emitted from the beam emitting unit 610 located at the end position overlaps the other end portion Eg2 of the shaping surface 311 in the Y direction. Therefore, it is possible to more efficiently detect the remaining shaping material without depending on the positions in the X and Y directions on the shaping surface 311.

In the present embodiment, in the remaining detection step, the control unit 500 determines that the remaining shaping material has been detected when the detection value of the detection beam DR by the beam receiving unit 620 becomes smaller than the reference value during the preset determination period. Accordingly, for example, by setting the determination period to a period without detecting shaping material small enough to not interfere with the operation of the discharge unit 200 or the like when the three-dimensional shaped object is shaped, it is possible to not detect but ignore the small shaping material in the remaining detection step. Therefore, it is possible to more efficiently shape the three-dimensional shaped object while preventing damage to the previously shaped three-dimensional shaped object, the discharge unit 200, and the like.

In the present embodiment, the control unit 500 starts the shaping of the three-dimensional shaped object when no remaining shaping material is detected in the remaining detection step. Therefore, it is possible to shape the three-dimensional shaped object while preventing the damage to the previously shaped three-dimensional shaped object, the discharge unit 200, and the like.

In the present embodiment, the three-dimensional shaping apparatus 100 includes the heating unit 700 moving in accordance with the movement of the discharge unit 200, and the nozzle opening 62 is located between the heating unit 700 and the shaping surface 311 in the Z direction. Therefore, as compared with an aspect in which the heating unit 700 is located between the nozzle opening 62 and the shaping surface 311 in the Z direction, the heating unit 700 and the shaping material laminated on the shaping surface 311 are less likely to come into contact with each other during the shaping of the three-dimensional shaped object, which increases a possibility that the three-dimensional shaped object can be shaped at high accuracy. In addition, the remaining detection step is executed by the control unit 500 before the shaping of the three-dimensional shaped object is started, and thus it is possible to prevent damage to the heating unit 700 due to contact between the heating unit 700 and the shaping material remaining on the shaping surface 311. In addition, it is possible to prevent damage to the three-dimensional shaped object previously shaped on the shaping surface 311 due to the contact between the previously shaped three-dimensional shaped object and the heating unit 700 or the like.

In the present embodiment, when viewed along the Z direction, the sensor unit 600 is arranged at a position not overlapping the heating unit 700. Therefore, the sensor unit 600 is prevented from being affected by heat of the heating unit 700. For example, in another embodiment, even when a positional relation between the sensor unit 600 and the heating unit 700 can be changed in the X and Y directions, the sensor unit 600 can be prevented from being affected by the heat of the heating unit 700 by arranging the sensor unit 600 at a position where the sensor unit 600 does not overlap the heating unit 700 regardless of how the relative position of the sensor unit 600 with respect to the heating unit 700 is changed by the position change unit 400 when viewed along the Z direction.

In the present embodiment, the position change unit 400 moves the discharge unit 200 with respect to the stage 300 along the Z direction and moves the stage 300 with respect to the discharge unit 200 in the X and Y directions. As a result, it is possible to move the relative position between the discharge unit 200 and the stage 300 without moving the heating unit 700, which moves in accordance with the discharge unit 200, with respect to the stage 300 in the X and Y directions. Therefore, it is possible to more stably change the relative position between the discharge unit 200 and the stage 300 by the position change unit 400 as compared with a case in which the discharge unit 200 moves with respect to the stage 300 in the X and Y directions. In particular, for example, even when the heating unit 700 is enlarged in the X and Y directions to cover the shaping surface 311 and a weight of the heating unit 700 increases, it is possible to more stably change the relative position between the discharge unit 200 and the stage 300. In addition, as in the present embodiment, when the position change unit 400 functions as the first movement unit, the position change unit 400 can move the sensor unit 600 relative to the stage 300 along the Y direction while fixing a position of the sensor unit 600 by moving the discharge unit 200 with respect to the stage 300 along the Z direction and moving the stage 300 with respect to the discharge unit 200 in the Y direction. Therefore, deviation of the position and an angle of the sensor unit 600 is prevented, and a detection accuracy of the remaining shaping material in the remaining detection step is improved.

B. Second Embodiment

Figure 11:
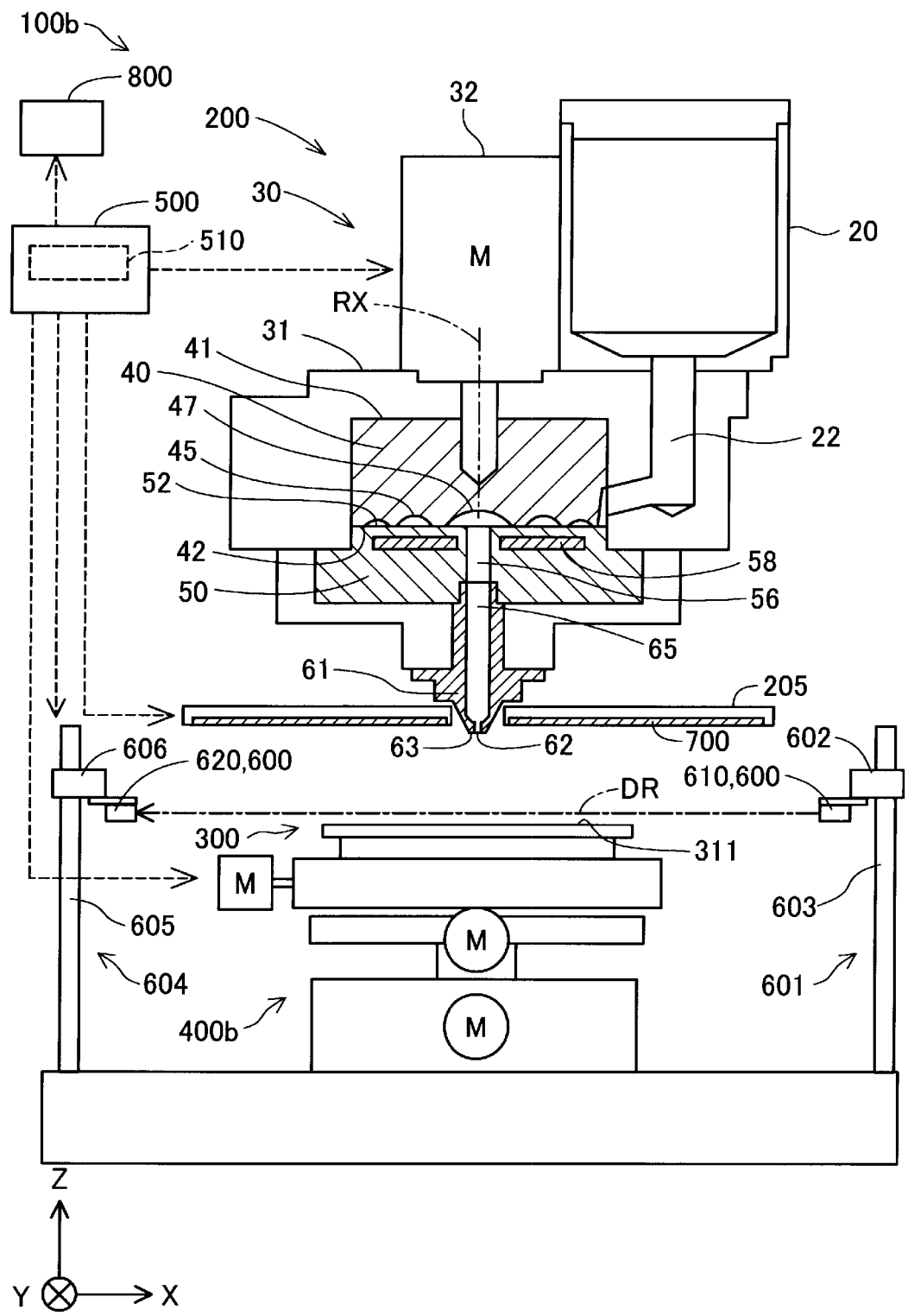
FIG. 11 is a diagram illustrating a schematic configuration of a three-dimensional shaping apparatus according to a second embodiment.

FIG. 11 is a diagram illustrating a schematic configuration of a three-dimensional shaping apparatus 100*b* according to a second embodiment. In the present embodiment, a position change unit 400b is different from the first embodiment, and moves the discharge unit 200 relative to the stage 300 by moving the stage 300 with respect to the discharge unit 200 in the X, Y, and Z directions. In addition to functioning as the first movement unit, the position change unit 400b also functions as a second movement unit that moves the sensor unit 600 relative to the stage 300 in the lamination direction, that is, the Z direction. In addition, in the present embodiment, the control unit 500 measures a dimension of the three-dimensional shaped object. Parts in the configuration of the three-dimensional shaping apparatus 100b that are not specifically described have a similar configuration as that of the first embodiment.

In the present embodiment, the control unit 500 measures dimensions in the Y and Z directions of a three-dimensional shaped object after being shaped in the shaping process illustrated in FIG. 6, that is, a completed three-dimensional shaped object. More specifically, in the present embodiment, the control unit 500 shapes a three-dimensional shaped object corresponding to the linear portion LP illustrated in FIG. 5 in the shaping process. Then, the control unit 500 measures the dimension of the three-dimensional shaped object after the shaping process is completed.

The control unit 500 measures the dimension in the Y direction of the three-dimensional shaped object after the shaping by controlling the sensor unit 600 and the position change unit 400b functioning as the first movement unit. More specifically, the control unit 500 measures the dimension in the Y direction of the three-dimensional shaped object after the shaping by moving the sensor unit 600 relative to the stage 300 along the Y direction while emitting the detection beam DR from the beam emitting unit 610. In addition, the control unit 500 measures the dimension in the Z direction of the three-dimensional shaped object after the shaping by controlling the sensor unit 600 and the position change unit 400b functioning as the second movement unit. More specifically, the control unit 500 measures the dimension in the Z direction of the three-dimensional shaped object after the shaping by moving the sensor unit 600 relative to the stage 300 along the Z direction while emitting the detection beam DR from the beam emitting unit 610.

Figure 12:
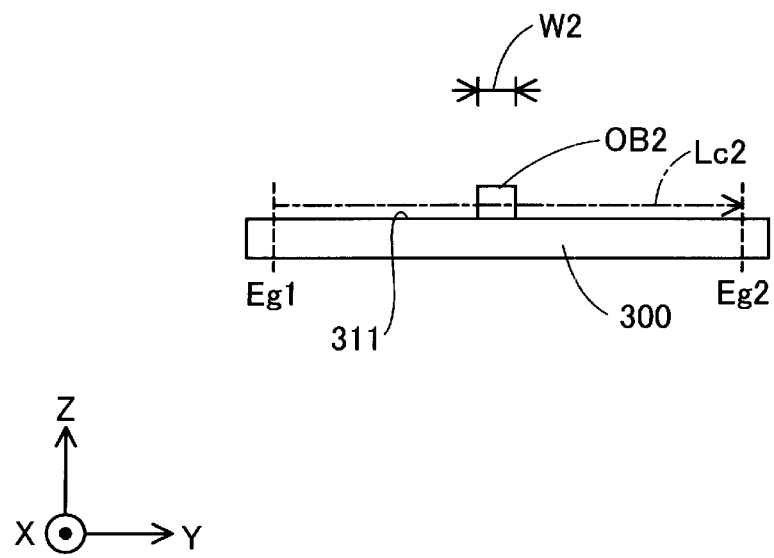
FIG. 12 is a diagram illustrating an example for measuring a dimension of the three-dimensional shaped object in the Y direction.

FIG. 12 is a diagram illustrating an example that a dimension W2 of the three-dimensional shaped object OB2 in the Y direction is measured by dimension measurement. In FIG. 12, a trajectory Lc2 of the detection beam DR in the Y direction is illustrated. Similar to the trajectory Lc illustrated in FIG. 9, the trajectory Lc2 is drawn by the beam emitting unit 610, which emits the detection beam DR traveling in the −X direction, being moved in the +Y direction by the position change unit 400. The dimension W2 illustrated in FIG. 12 corresponds to a line width of a shaping material of the three-dimensional shaped object OB2. In the example of FIG. 12, as in the case in which the remaining shaping material is irradiated with the detection beam DR, in the period in which the sensor unit 600 moves in the +Y direction, the intensity of the detection beam DR received by the beam receiving unit 620 is reduced during a period in which the three-dimensional shaped object OB2 is irradiated with the detection beam DR. Therefore, the control unit 500 can measure the dimension of the three-dimensional shaped object OB2 in the Y direction by calculating a difference between a coordinate at which the intensity of the detection beam DR received by the beam receiving unit 620 is reduced and a coordinate at which the intensity increases again. In another embodiment, the control unit 500 may measure the dimension W2 based on, for example, the period in which the intensity of the detection beam DR received by the beam receiving unit 620 is reduced and a movement speed of the sensor unit 600 along the Y direction during the period.

Figure 13:
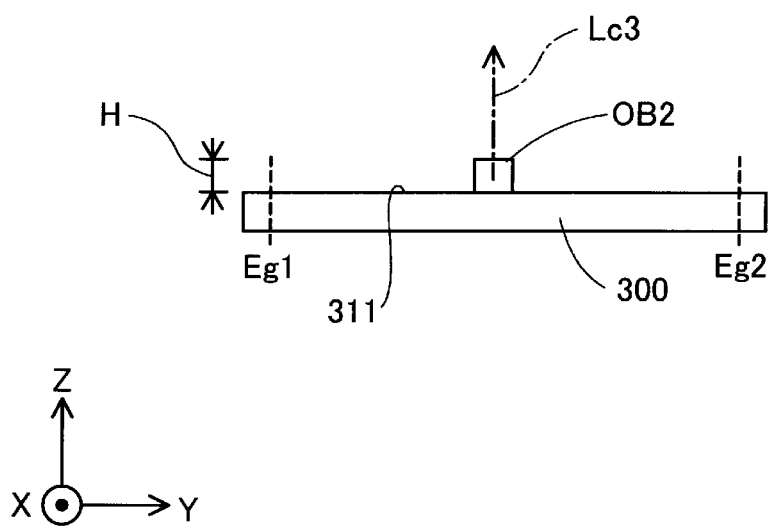
FIG. 13 is a diagram illustrating an example for measuring a dimension of the three-dimensional shaped object in a Z direction.

FIG. 13 is a diagram illustrating an example that a dimension H of the three-dimensional shaped object OB2 in the Z direction is measured by the dimension measurement. FIG. 13 illustrates a trajectory Lc3 of the detection beam DR in the Z direction by the dimension measurement. The trajectory Lc3 is drawn by the beam emitting unit 610, which emits the detection beam DR traveling in the −X direction, being moved in the +Z direction by the position change unit 400. The dimension H illustrated in FIG. 13 corresponds to a lamination pitch of the shaping material of the three-dimensional shaped object OB2. As illustrated in FIG. 13, in the present embodiment, when the measurement of the dimensions of the three-dimensional shaped object OB2 in the Z direction is started, the detection beam DR has advanced in the +Y direction at a position on a +Z direction side by a distance D from the shaping surface 311. Therefore, when the dimension H is measured, the control unit 500 measures, as the dimension H, a value obtained by adding the distance D to the difference between the coordinate at which the intensity of the received detection beam DR is reduced and the coordinate at which the intensity increases again. The distance D is measured in advance using, for example, a thickness gauge. In addition, in another embodiment, for example, the three-dimensional shaped object OB2 may be shaped to be bridged between two bases having substantially equal heights and separated in the X direction and the Y direction. In this case, a space is formed between the three-dimensional shaped object OB2 and the shaping surface 311, and thus the dimension H can be measured simply based on the difference between the coordinate in which the intensity of the received detection beam DR is reduced and the coordinate in which the intensity increases again. In another embodiment, the control unit 500 may measure the dimension H based on, for example, the period in which the intensity of the detection beam DR received by the beam receiving unit 620 is reduced and a movement speed of the sensor unit 600 along the Z direction during the period.

For example, the control unit 500 may control the notification unit 800 to notify the user of each measured dimension. As a result, the user can grasp, for example, a difference between a prediction value and a measurement value of each dimension of the three-dimensional shaped object OB2. In addition, the control unit 500 may compare the measurement value of each dimension of the three-dimensional shaped object OB2 and the prediction value of the dimension of the three-dimensional shaped object OB2 predicted from a control value of the plasticizing unit 30 or the position change unit 400, and then change the control value of the plasticizing unit 30 or the position change unit 400 in the shaping process to be executed next based on a comparison result. For example, when the measured dimension H is smaller than the prediction value of the dimension of the three-dimensional shaped object OB2 in the Z direction, the control unit 500 may change the control value of the position change unit 400b such that the gap Gp illustrated in FIG. 5 increases. In addition, when the measured dimension W2 is larger than the prediction value of the dimension of the three-dimensional shaped object OB2 in the Y direction, the control unit 500 may decrease an amount of the shaping material discharged from the nozzle opening 62 by decreasing a rotation speed of the drive motor 32. This increases a possibility that a three-dimensional shaped object having desired dimensions can be shaped. In another embodiment, for example, when a valve, a plunger, or the like for adjusting the amount of the shaping material discharged from the nozzle opening 62 is provided in the nozzle flow path 65 of the discharge unit 200, the control unit 500 may change a control value of the valve, the plunger, or the like based on the comparison result of the dimensions.

In another embodiment, the control unit 500 may measure the dimensions of the three-dimensional shaped object during the shaping while the three-dimensional shaped object is being shaped in the shaping process. For example, after one linear portion constituting the three-dimensional shaped object is shaped, dimensions of the linear portion are measured in the same manner as described with reference to FIGS. 12 and 13, and thus the control value of the plasticizing unit 30 or the position change unit 400 at the time of shaping a portion to be shaped later than the linear portion can be changed based on a comparison result between a prediction value and a measurement value of the dimensions of the linear portion. As in the present embodiment, this increases a possibility that a three-dimensional shaped object having desired dimensions can be shaped. In addition, the control unit 500 may measure, for example, dimensions of the entire three-dimensional shaped object after the shaping. In this case, it is possible to grasp a difference between a prediction value and a measurement value of dimensions of the entire three-dimensional shaped object.

The three-dimensional shaping apparatus 100*b* of the present embodiment described above can also prevent the damage to a previously shaped three-dimensional shaped object, the discharge unit 200, and the like. In particular, in the present embodiment, the dimension in the Y direction of the three-dimensional shaped object during or after the shaping is measured by controlling the sensor unit 600 and the position change unit 400*b* functioning as the first movement unit. Therefore, it is possible to easily measure the dimension in the Y direction of the three-dimensional shaped object during or after the shaping.

In the present embodiment, the control unit 500 measures the dimension in the Z direction of the three-dimensional shaped object after the shaping by controlling the sensor unit 600 and the position change unit 400*b* functioning as the second movement unit. Therefore, it is possible to easily measure the dimension in the Z direction of the three-dimensional shaped object during or after the shaping.

In another embodiment, for example, the control unit 500 may measure the dimension in the Z direction of the three-dimensional shaped object during or after the shaping alone without measuring the dimension in the Y direction, or may measure the dimension in the Y direction of the three-dimensional shaped object alone without measuring the dimension in the Z direction.

C. Third Embodiment

Figure 14:
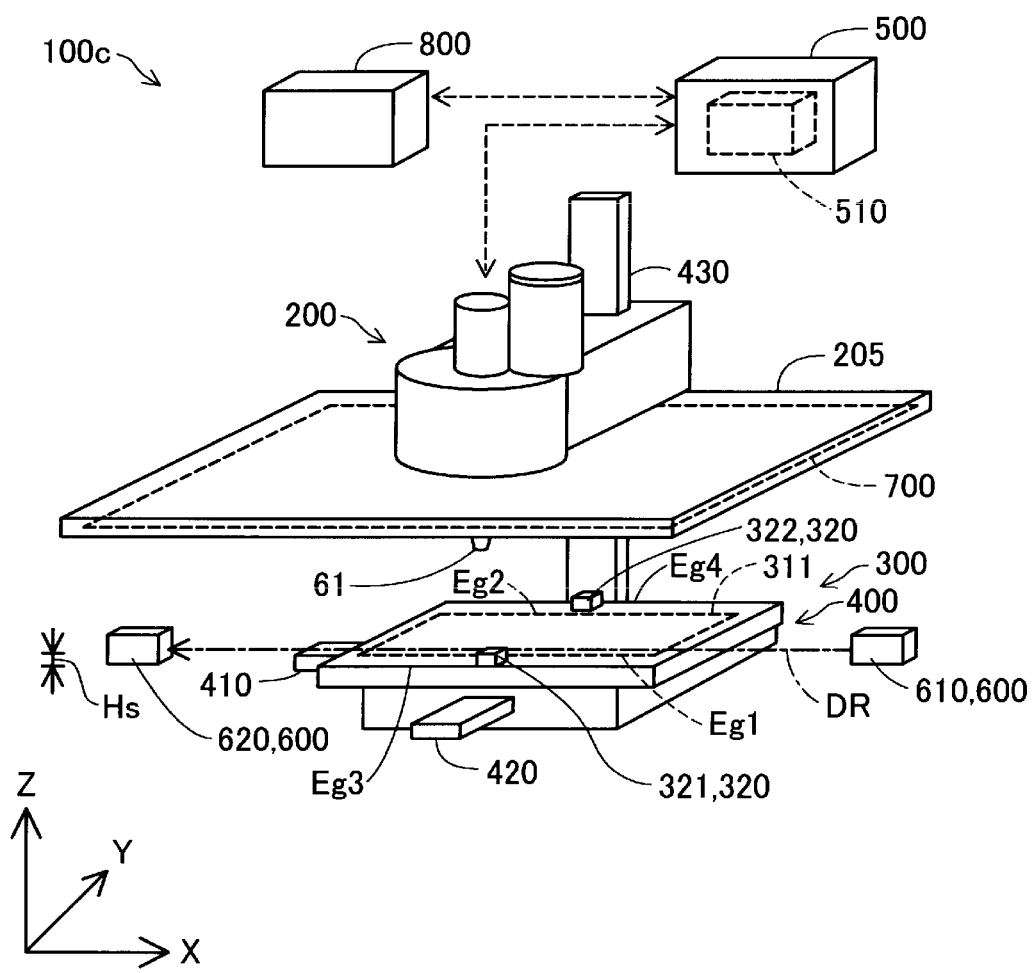
FIG. 14 is a diagram illustrating a schematic configuration of a three-dimensional shaping apparatus according to a third embodiment.

FIG. 14 is a diagram illustrating a schematic configuration of a three-dimensional shaping apparatus 100*c* according to a third embodiment. In the present embodiment, the control unit 500 executes an inspection step to be described later before execution of the remaining detection step. Parts in the configuration of the three-dimensional shaping apparatus 100*c* that are not specifically described have a similar configuration as that of the first embodiment.

As illustrated in FIG. 14, reference objects 320 having a preset height Hs are placed on the stage 300 of the present embodiment. More specifically, in the present embodiment, a first reference object 321 and a second reference object 322 are placed and fixed on the upper surface of the stage 300 as the reference objects 320. The first reference object 321 is placed on the upper surface of the stage 300 at a position in the −Y direction with respect to the shaping surface 311. The second reference object 322 is placed on the upper surface of the stage 300 at a position opposite to the first reference object 321 in the Y direction with the shaping surface 311 interposed therebetween. That is, the shaping surface 311 is located between the first reference object 321 and the second reference object 322 in the Y direction.

The inspection step described above refers to a step of the control unit 500 detecting a degree of horizontality of the stage 300 by emitting the detection beam DR from the beam emitting unit 610 to detect the reference objects 320 placed on the stage 300. In the present embodiment, in the inspection step, the control unit 500 moves the sensor unit 600 relative to the stage 300 along the Y direction while emitting the detection beam DR from the beam emitting unit 610, thereby detecting the reference objects 320 placed on the stage 300. More specifically, in the inspection step, when viewed along the Z direction, the control unit 500 moves the sensor unit 600 relative to the stage 300 from a position at which the detection beam DR overlaps an end portion Eg3 of the stage 300 in the −Y direction to a position at which the detection beam DR overlaps an end portion Eg4 of the stage 300 in the +Y direction.

As described above, the control unit 500 detects the degree of horizontality of the stage 300 in the inspection step. For example, in the inspection step, when one reference object 320 is detected alone and the other reference object 320 is not detected, the control unit 500 detects that the stage 300 is inclined with respect to the Y axis. In the inspection step, when neither of the reference objects 320 is detected, the control unit 500 can also detect that a distance between the detection beam DR and the upper surface of the stage 300 is larger than the height Hs.

For example, the control unit 500 may control the notification unit 800 to notify the user of a detection result of the degree of horizontality of the stage 300. In addition, the control unit 500 may repeatedly execute the inspection step until determining that the stage 300 is not inclined with respect to the Y axis.

The three-dimensional shaping apparatus 100*c* of the present embodiment described above can also prevent the damage to the previously shaped three-dimensional shaped object, the discharge unit 200, and the like. In particular, in the present embodiment, the control unit 500 executes, before the execution of the remaining detection step, the inspection step of detecting the degree of horizontality of the stage 300 by emitting the detection beam DR from the beam emitting unit 610 to detect the reference objects 320 placed on the stage 300. Accordingly, the degree of horizontality of the stage 300 can be detected by the sensor unit 600 before the start of the remaining detection step and the start of the shaping of the three-dimensional shaped object. In the present embodiment, this particularly increases a possibility that the remaining detection step can be executed in a state in which the inclination of the stage 300 with respect to the Y direction is smaller, thereby increasing a possibility that the detection accuracy of the remaining shaping material in the remaining detection step is improved.

In another embodiment, the reference objects 320 may not be fixed to the stage 300, and may be placed on the stage 300 immediately before the inspection step is executed by, for example, a robot operated under the control of the control unit 500 or a manual operation. In this case, for example, inclination of the stage 300 with respect to the X direction also can be detected by executing the inspection step a plurality of times and changing the position in the X direction of the stage 300 on which the reference objects 320 are placed each time the inspection step is executed. More specifically, for example, after the inspection step is executed by the control unit 500 in a state in which the reference objects 320 are placed at a position on the −X direction with respect to the shaping surface 311 in the upper surface of the stage 300, the inspection step can be executed by the control unit 500 in a state in which the reference objects 320 are placed at a position on the opposite side of the shaping surface 311 in the X direction in the upper surface of the stage 300. In this time, when the reference objects 320 are detected in one inspection step and are not detected in the other inspection step, the stage 300 is inclined with respect to the X direction, which is a traveling direction of the detection beam DR. In this way, the control unit 500 can detect the inclination of the stage 300 with respect to the X direction. In addition, it is also possible to estimate the distance between the detection beam DR and the upper surface of the stage 300 by, for example, executing the inspection step a plurality of times and placing, on the stage 300, reference objects 320 having a difference height each time the inspection step is executed. For example, when reference objects 320 having a height Hs' are not detected in a first reference object detection and reference objects 320 having a height Hs2 higher than the height Hs' and placed in the same position as that of the first reference object detection are detected in a second reference object detection, the control unit 500 can estimate that the distance between the detection beam DR and the upper surface of the stage 300 is larger than the height Hs' and equal to or less than the height Hs2.

D. Other Embodiments (D-1) In the embodiments described above, the sensor unit 600 detects the shaping material supported on the shaping surface 311. In contrast, the sensor unit 600 may also detect other residues supported on the shaping surface 311. For example, the sensor unit 600 may detect, as a residue, a tool or the like left behind on the shaping surface 311 by the user, a component such as a screw falling off the shaping surface 311 from the discharge unit 200 and the like. The control unit 500 may control the sensor unit 600 to detect the residue remaining on the shaping surface 311 before the start of the shaping of the three-dimensional shaped object. Accordingly, when the residue is detected, the residue can be removed from the shaping surface 311 before the start of the shaping of the three-dimensional shaped object. Therefore, it is possible to prevent damage to the residue, the discharge unit 200, and the like due to contact between the residue and units such as the discharge unit 200 of the three-dimensional shaping apparatus 100.

(D-2) In the embodiments described above, the sensor unit 600 is configured with an optical sensor. In contrast, the sensor unit 600 may be another sensor. For example, the sensor unit 600 may be a temperature sensor detecting a temperature of the shaped object supported on the shaping surface 311, a non-contact temperature sensor configured with an infrared thermometer or a thermal camera, or a contact temperature sensor that is provided on the shaping surface 311 and that detects the temperature of the shaped object supported on the shaping surface 311. In this case, the detection unit 510 may execute the remaining detection step before the shaping of the shaped object is started and while the remaining shaping material has a temperature that can be detected by the temperature sensor. In addition, the sensor unit 600 may be configured with, for example, a weight sensor such as a load cell type or an electromagnetic force equilibrium type for measuring a weight of the shaped object laminated on the stage 300.

(D-3) In the embodiments described above, the beam emitting unit 610 and the beam receiving unit 620 are aligned with each other in the X direction. In contrast, the beam emitting unit 610 and the beam receiving unit 620 may not be aligned with each other. For example, a reflection plate for reflecting the detection beam DR emitted from the beam emitting unit 610 may be arranged at a position facing the beam emitting unit 610 in the X direction with the shaping surface 311 interposed therebetween, and the beam receiving unit 620 may face the reflection plate.

(D-4) In the embodiments described above, when viewed along the Z direction, the start position is the position at which the detection beam DR emitted from the beam emitting unit 610 located at the start position overlaps one end portion Eg1 of the shaping surface 311 in the Y direction. When viewed along the Z direction, the end position is the position at which the detection beam DR emitted from the beam emitting unit 610 located at the end position overlaps the other end portion Eg2 of the shaping surface 311 in the Y direction. In contrast, the start position and the end position may be positions different from the positions described above. For example, the start position and the end position may be positions on an outer side as viewed from the shaping surface 311 in the Y direction. In such a case as well, it is possible to more efficiently detect the remaining shaping material without depending on the positions of the remaining shaping material on the shaping surface 311 in the X and Y directions. In addition, the start position may be, for example, a center position of the shaping surface 311 in the Y direction. In this case, in the remaining detection step, for example, the control unit 500 may move the sensor unit 600 in the −Y direction or the +Y direction, and then move the sensor unit 600 in the reverse direction, or may further return the sensor unit 600 to the center position in the Y direction to end the movement of the sensor unit 600. In addition, in the remaining detection step, for example, when the remaining shaping material is detected while the sensor unit 600 is being moved from the start position to the end position, the control unit 500 may stop the movement of the sensor unit 600 at that time. In this case, it is possible to more efficiently detect the remaining shaping material by setting the start position to a position at which the remaining shaping material is more likely to be remained, for example, the above-described center position of the shaping surface 311 in the Y direction.

(D-5) In the embodiments described above, the position change unit 400 functions as the first movement unit and the second movement unit. In contrast, the position change unit 400 may not function as the first movement unit or the second movement unit. For example, a movement unit for simultaneously moving the beam emitting unit 610 and the beam receiving unit 620 in the X direction, the Y direction, and the Z direction with respect to the stage 300 may be provided separately from the position change unit 400.

(D-6) In the embodiments described above, in the remaining detection step, the detection unit 510 determines that the remaining shaping material has been detected when the detection value of the detection beam DR by the beam receiving unit 620 becomes smaller than the reference value during the preset determination period. In contrast, the determination period may not be set, and for example, in the remaining detection step, the control unit 500 may simply determine that the remaining shaping material has been detected when the intensity of the detection beam DR received by the beam receiving unit 620 is smaller than the reference value. In addition, for example, the detection unit 510 may determine that the remaining shaping material has been detected when the detection value of the detection beam DR by the beam receiving unit 620 is zero.

(D-7) In the embodiments described above, the heating unit 700 is provided. In contrast, the heating unit 700 may not be provided.

(D-8) In the embodiments described above, when viewed along the Z direction, the heating unit 700 and the sensor unit 600 are arranged at positions not overlapping each other. In contrast, when viewed along the Z direction, the heating unit 700 and the sensor unit 600 may be arranged at positions overlapping each other.

(D-9) In the embodiments described above, the plasticizing unit 30 of the discharge unit 200 plasticizes the material by the flat screw and generates the shaping material. In contrast, for example, the plasticizing unit 30 may plasticize the material by, for example, rotating an in-line screw, thereby generating the shaping material. In addition, the discharge unit 200 may be configured as a head plasticizing and discharging a filament material.

(D-10) In the embodiments described above, a pellet-shaped ABS resin material is used as a raw material to be supplied to the material supply unit 20. In contrast, the three-dimensional shaping apparatus 100 can shape a three-dimensional shaped object using various materials such as a thermoplastic material, a metal material, and a ceramic material as a main material. Here, the term "main material" means a major material for forming a shape of the three-dimensional shaped object, and means a material that occupies 50% by weight or more of the three-dimensional shaped object. The above-described shaping material includes a material obtained by melting these main materials alone or a material obtained by melting the main material and a part of components contained in the main material into a paste shape.

When the thermoplastic material is used as the main material, the shaping material is generated by plasticizing the material in the plasticizing unit 30. The term "plasticize" means applying heat to melt the thermoplastic material.

Examples of the thermoplastic material may include the following thermoplastic resin materials.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyether ether ketone (PEEK), polycarbonate (PC), modified polyphenylene ether, polybutylene terephthalate, or polyethylene terephthalate, and engineering plastics such as polysulfone, polyether sulfone, polyphenylene sulfide, polyarylate, polyimide, polyamideimide, polyetherimide, or polyether ether ketone An additive such as wax, flame retardant, antioxidant, and heat stabilizer may be mixed into the thermoplastic material, in addition to pigment, metal, and ceramic. In the plasticizing unit 30, the thermoplastic material is converted into a melted state by being plasticized by rotation of the screw 40 and heating of the heater 58. The shaping material generated by the melting of the thermoplastic material is discharged from the nozzle 61, and then cured due to a decrease in temperature.

It is desirable that the thermoplastic material is injected from the nozzle 61 in a state of being melted completely by being heated to a temperature equal to or higher than a glass transition point thereof. For example, a glass transition point of the ABS resin is about 120° C., and is desirably injected from the nozzle 61 at about 200° C.

In the three-dimensional shaping apparatus 100, for example, the following metal materials may be used as the main material instead of the above-described thermoplastic material. In this case, it is desirable that a component to be melted at the time of generating the shaping material is mixed into a powder material obtained by converting the following metal materials into a powder shape, and then the mixture is put into the plasticizing unit 30 as the raw material.

Examples of Metal Material

Single metals such as magnesium (Mg), iron (Fe), cobalt (Co), chromium (Cr), aluminum (Al), titanium (Ti), copper (Cu), nickel (Ni), or an alloy containing one or more of these metals Examples of Alloy Maraging steel, stainless steel, cobalt chromium molybdenum, titanium alloy, nickel alloy, aluminum alloy, cobalt alloy, and cobalt chromium alloy In the three-dimensional shaping apparatus 100, a ceramic material may be used as the main material instead of the above-described metal materials. Examples of the ceramic material may include an oxide ceramic such as silicon dioxide, titanium dioxide, aluminum oxide, and zirconium oxide, and a non-oxide ceramic such as aluminum nitride. When the metal material or the ceramic material described above is used as the main material, the shaping material arranged on the stage 300 may be cured by irradiation with a laser or sintering with hot air and the like.

A powder material of the metal material or the ceramic material added into the material supply unit 20 as the raw material may be a mixed material obtained by mixing a plurality of types of powders including a powder of a single metal, a powder of an alloy, or a powder of a ceramic material. The powder material of the metal material or the ceramic material may be coated with, for example, the thermoplastic resin shown above or another thermoplastic resin. In this case, the thermoplastic resin may be melted to exhibit fluidity in the plasticizing unit 30.

For example, the following solvents may be added to the powder material of the metal material or the ceramic material added into the material supply unit 20 as the raw material. The solvent can be used alone or in combination of two or more selected from the following.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate In addition, for example, the following binder may be added to the powder material of the metal material or the ceramic material added into the material supply unit 20 as the raw material.

Examples of Binder

Acrylic resin, epoxy resin, silicone resin, cellulose-based resin, or other synthetic resins; and polylactic acid (PLA), polyamide (PA), polyphenylene sulfide (PPS), polyether ether ketone (PEEK), or other thermoplastic resins E. Other Aspects The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features of the above-described embodiments corresponding to technical features in each of the following aspects can be replaced or combined as appropriate. In addition, the technical features can be deleted as appropriate unless described as essential in the present description.

(1) According to an aspect of the present disclosure, a three-dimensional shaping apparatus is provided. The three-dimensional shaping apparatus includes: a discharge unit having a nozzle opening and configured to discharge a shaping material from the nozzle opening; a stage having a shaping surface supporting the shaping material discharged from the discharge unit; a sensor unit configured to detect the shaping material supported on the shaping surface; and a control unit configured to control the discharge unit to laminate the shaping material on the shaping surface, thereby shaping a three-dimensional shaped object. The control unit is configured to execute, before start of the shaping of the three-dimensional shaped object, a remaining detection step of detecting the shaping material remaining on the shaping surface by controlling the sensor unit.

According to the aspect, when the shaping material remaining on the shaping surface is detected, the shaping material can be removed from the shaping surface before the shaping of the three-dimensional shaped object is started. Therefore, it is possible to prevent damage to the discharge unit and the like of the three-dimensional shaping apparatus due to contact between units such as the discharge unit and the remaining shaping material remaining on the shaping surface. In addition, it is possible to prevent damage to a three-dimensional shaped object previously shaped on the shaping surface due to contact between the previously shaped three-dimensional shaped object and the discharge unit and the like.

(2) In the aspect described above, the sensor unit may include a beam emitting unit configured to emit a detection beam in a first direction along the shaping surface, and a beam receiving unit facing the beam emitting unit in the first direction with the shaping surface interposed therebetween and configured to receive the detection beam. The three-dimensional shaping apparatus may further include a first movement unit configured to move the sensor unit relative to the stage along a second direction that is along the shaping surface and that intersects the first direction. The control unit may move the sensor unit relative to the stage along the second direction while emitting the detection beam from the beam emitting unit in the remaining detection step. According to the aspect, it is possible to more easily detect the remaining shaping material without causing the remaining shaping material remaining on the shaping surface and the sensor unit to contact with each other.

(3) In the aspect described above, the control unit may determine that the shaping material remaining on the shaping surface has been detected when a detection value of the detection beam by the beam receiving unit is lower than a preset value over a preset period in the remaining detection step. According to the aspect, for example, by setting the determination period to a period without detecting the shaping material small enough to not interfere with the operation of the discharge unit or the like when the three-dimensional shaped object is shaped, it is possible to not detect but ignore the small shaping material in the remaining detection step. Therefore, it is possible to more efficiently shape the three-dimensional shaped object while preventing the damage to the previously shaped three-dimensional shaped object, the discharge unit, and the like.

(4) In the aspect described above, the control unit may execute, before the execution of the remaining detection step, an inspection step of detecting a degree of horizontality of the stage by emitting the detection beam from the beam emitting unit to detect a reference object placed on the stage. According to the aspect, it is possible to detect the degree of horizontality of the stage by the sensor unit before the start of the remaining detection step and the start of the shaping of the three-dimensional shaped object.

(5) In the aspect described above, the control unit may measure a dimension in the second direction of the three-dimensional shaped object during or after the shaping by controlling the sensor unit and the first movement unit. According to the aspect, it is possible to easily measure the dimension in the second direction of the three-dimensional shaped object during or after the shaping.

(6) In the aspect described above, the three-dimensional shaping apparatus may further include a second movement unit configured to move the sensor unit relative to the stage along a lamination direction of the shaping material. The detection unit may measure a dimension in the lamination direction of the three-dimensional shaped object during or after the shaping by controlling the sensor unit and the second movement unit. According to the aspect, it is possible to easily measure the dimension in the lamination direction of the three-dimensional shaped object during or after the shaping.

(7) In the aspect described above, the control unit may start the shaping of the three-dimensional shaped object when no shaping material remaining on the shaping surface is detected in the remaining detection step. According to the aspect, it is possible to shape the three-dimensional shaped object while preventing the damage to the previously shaped three-dimensional shaped object, the discharge unit, and the like.

(8) In the aspect described above, the three-dimensional shaping apparatus may further include a position change unit configured to move the discharge unit relative to the stage and a heating unit configured to move in accordance with the movement of the discharge unit and heat the shaping material laminated on the shaping surface. The nozzle opening may be located between the heating unit and the shaping surface in a third direction perpendicular to the shaping surface. According to the aspect, as compared with an aspect in which the heating unit is located between the nozzle opening and the shaping surface in the third direction, the heating unit and the shaping material laminated on the shaping surface are less likely to come into contact with each other during the shaping of the three-dimensional shaped object, which increases a possibility that the three-dimensional shaped object can be shaped at high accuracy. In addition, the remaining detection step is executed before the shaping of the three-dimensional shaped object is started, and thus it is possible to prevent damage to the heating unit due to contact between the heating unit and the shaping material remaining on the shaping surface. In addition, it is possible to prevent the damage to the previously shaped three-dimensional shaped object on the shaping surface due to contact between the previously shaped three-dimensional shaped object and the heating unit.

(9) In the aspect described above, the sensor unit may be arranged at a position not overlapping the heating unit when viewed along the third direction. According to the aspect, the sensor unit is prevented from being affected by the heat of the heating unit.

(10) In the aspect described above, the position change unit may move the discharge unit relative to the stage along the third direction and move the stage relative to the discharge unit along a direction orthogonal to the third direction. According to the aspect, it is possible to change the relative position between the discharge unit and the stage without moving the heating unit moving in accordance with the discharge unit relative to the stage along the direction orthogonal to the third direction. Therefore, it is possible to more stably change the relative position between the discharge unit and the stage by the position change unit as compared with a case in which the discharge unit is moved with respect to the stage in the direction orthogonal to the third direction.

What is claimed is:

1. A three-dimensional shaping apparatus, comprising:
a discharge unit having a nozzle opening and configured to discharge a shaping material from the nozzle opening;
a stage having a shaping surface supporting the shaping material discharged from the discharge unit;
a sensor unit configured to detect the shaping material supported on the shaping surface; and
a control unit configured to control the discharge unit to laminate the shaping material on the shaping surface, thereby shaping a three-dimensional shaped object, wherein
the control unit is configured to execute, before start of the shaping of the three-dimensional shaped object, a remaining detection step of detecting whether or not the shaping material remains on the shaping surface by controlling the sensor unit, and a notifying step of notifying a user in a case where the sensor detects remaining shaping material on the shaping surface before the start of shaping of the three-dimensional shaped object, and the control unit is configured to control the discharge unit to laminate the shaping material after the sensor unit detects no remaining shaping material on the shaping surface,
wherein the sensor unit includes a beam emitting unit positioned above the shaping surface and configured to emit a detection beam in a first direction along the shaping surface, and a beam receiving unit positioned above the shaping surface, facing the beam emitting unit in the first direction with the shaping surface interposed therebetween or facing a reflection plate which reflects the detection beam and faces the beam emitting unit in the first direction with the shaping surface interposed therebetween, and configured to receive the detection beam, and
wherein the control unit notifies a user in a case where the sensor detects remaining shaping material on the shaping surface,
wherein the stage further comprises a first reference object and a second reference object, the first reference object and the second reference object having a preset height above a shaping surface of the stage, and wherein the control unit is configured to move the beam emitting unit orthogonal to the first direction to move the detection beam between the first reference object and the second reference object to detect (i) an inclination of the stage based upon detection of one or both of the first reference object and the second reference object and (ii) a distance between the detection beam and the stage that is larger than the preset height based upon the detection of neither of the first reference object and the second reference object.

2. The three-dimensional shaping apparatus according to claim 1, wherein
the three-dimensional shaping apparatus further comprises a first movement unit configured to move the sensor unit relative to the stage along a second direction that is along the shaping surface and that intersects the first direction, and
the control unit is configured to move the sensor unit relative to the stage along the second direction while emitting the detection beam from the beam emitting unit in the remaining detection step.

3. The three-dimensional shaping apparatus according to claim 1, wherein
the control unit is configured to determine that the shaping material remaining on the shaping surface was detected when a detection value of the detection beam by the beam receiving unit is lower than a preset value over a preset period in the remaining detection step.

4. The three-dimensional shaping apparatus according to claim 1, wherein
the control unit is configured to measure a dimension in a second direction of the three-dimensional shaped object during or after the shaping by controlling the sensor unit and a first movement unit.

5. The three-dimensional shaping apparatus according to claim 2, further comprising:
a second movement unit configured to move the sensor unit relative to the stage along a lamination direction of the shaping material, wherein
the control unit is configured to measure a dimension in the lamination direction of the three-dimensional shaped object during or after the shaping by controlling the sensor unit and the second movement unit.

6. The three-dimensional shaping apparatus according to claim 1, wherein
the control unit is configured to start the shaping of the three-dimensional shaped object when no shaping material remaining on the shaping surface is detected in the remaining detection step.

7. The three-dimensional shaping apparatus according to claim 1, further comprising:
a position change unit configured to move the discharge unit relative to the stage; and
heating unit configured to move in accordance with movement of the discharge unit and heat the shaping material laminated on the shaping surface, wherein nozzle opening is located between the heating unit and the shaping surface in a third direction perpendicular to the shaping surface.

8. The three-dimensional shaping apparatus according to claim 7, wherein
the sensor unit is arranged at a position not overlapping the heating unit when viewed along the third direction.

9. The three-dimensional shaping apparatus according to claim 7, wherein
the position change unit is configured to move the discharge unit relative to the stage along the third direction and move the stage relative to the discharge unit along a direction orthogonal to the third direction.

10. The three-dimensional shaping apparatus according to claim 1, wherein the beam emitting unit and the beam receiving unit are positioned such that a distance between the detection beam and the shaping surface is smaller than a gap which is a distance between the nozzle and the shaping surface in shaping the three-dimensional shaped object.

11. The three-dimensional shaping apparatus according to claim 1, wherein the control unit causes the three-dimensional shaping apparatus to stand by for a predetermined period in a case where the sensor detects the remaining shaping material on the shaping surface.

12. The three-dimensional shaping apparatus according to claim 9, wherein in a lamination direction of the shaping material, an area of the heating unit is larger than an area of the shaping surface.

13. The three-dimensional shaping apparatus according to claim 1, wherein the control unit is configured to execute the remaining detection step after acquiring shaping data including path data representing a movement pathway of a nozzle having the nozzle opening for forming the three-dimensional shaped object and injection amount data representing an injection amount of the shaping material from the nozzle.

* * * * *